(12) United States Patent
Chien

(10) Patent No.: US 11,652,701 B2
(45) Date of Patent: May 16, 2023

(54) PREDICTING NETWORK ANOMALIES BASED ON EVENT COUNTS

(71) Applicant: ARRIS Enterprises LLC, Suwanee, GA (US)

(72) Inventor: Cheng-Ming Chien, Taipei (TW)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/514,541

(22) Filed: Oct. 29, 2021

(65) Prior Publication Data
US 2022/0141096 A1    May 5, 2022

Related U.S. Application Data

(60) Provisional application No. 63/108,702, filed on Nov. 2, 2020.

(51) Int. Cl.
| | | |
|---|---|---|
| *G06F 15/173* | (2006.01) | |
| *H04L 41/147* | (2022.01) | |
| *H04L 41/14* | (2022.01) | |
| *H04L 41/0654* | (2022.01) | |
| *H04W 84/12* | (2009.01) | |

(52) U.S. Cl.
CPC ........ *H04L 41/147* (2013.01); *H04L 41/0654* (2013.01); *H04L 41/145* (2013.01); *H04W 84/12* (2013.01)

(58) Field of Classification Search
CPC . H04L 41/147; H04L 41/0654; H04L 41/145; H04W 84/12
See application file for complete search history.

(56) References Cited

U.S. PATENT DOCUMENTS

| | | | | |
|---|---|---|---|---|
| 9,444,715 | B2* | 9/2016 | Pignataro | ................ H04L 41/28 |
| 9,904,587 | B1* | 2/2018 | Potlapally | ........... G06F 11/3419 |
| 11,331,045 | B1* | 5/2022 | Moschella | ............ A61B 5/316 |
| 2006/0034237 | A1* | 2/2006 | Patrick | .................... H04L 67/10 |
| | | | | 370/352 |
| 2019/0361784 | A1* | 11/2019 | Savanur | ............... G06K 9/6282 |

* cited by examiner

*Primary Examiner* — Wing F Chan
*Assistant Examiner* — Joseph R Maniwang
(74) *Attorney, Agent, or Firm* — Steven Stupp; Stewart Wiener

(57) ABSTRACT

An electronic device (such as a controller) is described. During operation, the electronic device receives, from a second electronic devices, information that specifies occurrences of different types of events in a network (which includes the second electronic devices). For example, the information may include counts of the occurrences of the different types of events in the network, which may be collected by the second electronic devices. Then, the electronic device aggregates the information about the different types of events in the network, and stores the aggregated information in memory. Moreover, the electronic device predicts an occurrence of an anomaly or an error in the network based at least in part on the aggregated information and a pretrained machine-learning model (such as a neural network). Next, the electronic device selectively performs a remedial action based at least in part on the prediction.

20 Claims, 6 Drawing Sheets

PREDICTING NETWORK ANOMALIES BASED ON EVENT COUNTS

CROSS REFERENCE TO RELATED APPLICATIONS

This application claims priority under 35 U.S.C. 119(e) to: U.S. Provisional Application Ser. No. 63/108,702, "Predicting Network Anomalies Based on Event Counts," filed on Nov. 2, 2020, by Cheng-Ming Chien, the contents of which are herein incorporated by reference.

FIELD

The described embodiments relate to techniques for predicting network anomalies or errors based at least in part on event counts, such as occurrences of different types of packet or frame handling events, using machine learning.

BACKGROUND

Many electronic devices are capable of wirelessly communicating with other electronic devices. For example, these electronic devices can include a networking subsystem that implements a network interface for: a cellular network (UMTS, LTE, etc.), a wireless local area network or WLAN (e.g., a wireless network such as described in the Institute of Electrical and Electronics Engineers (IEEE) 802.11 standard or Bluetooth™ from the Bluetooth Special Interest Group of Kirkland, Wash.), and/or another type of wireless network.

In many networks, computer network devices that facilitate access to the networks (such as access points or radio nodes) are configured and managed by local or cloud-based controllers. However, it can be difficult to scale this network architecture in large deployments, such as when a controller manages tens of thousands of access points in wireless local area networks (WLANs). Notably, in large deployments, there are often multiple processes running concurrently, which can make it difficult to identify the root cause when a network anomaly or error occurs. Moreover, it can be difficult to maintain the performance of an event or behavior log at scale.

Furthermore, even in a testing environment, when there are dedicated event or behavior logs for diagnostic purposes, it can be difficult to translate the event or behavior log into a format that is understandable by humans, such as a network operator. Consequently, it can be difficult to collect, interpret and use information about events in large-scale networks in order to maintain or improve communication performance.

SUMMARY

An electronic device is described. This electronic device includes: an interface circuit that communicates with second electronic devices, which are included in a network; memory that stores program instructions; a processor that executes the program instructions; and an integrated circuit that implements a pretrained machine-learning model. During operation, the interface circuit receives, from the second electronic devices, information that specifies occurrences of different types of events in the network. Then, the processor aggregates the information about the different types of events in the network, and stores the aggregated information in the memory. Moreover, the integrated circuit predicts an occurrence of an anomaly or an error in the network based at least in part on the aggregated information. Next, the processor selectively performs a remedial action based at least in part on the prediction.

Note that the network may include one or more WLANs and the second electronic devices may access points.

Moreover, the information may include counts of the occurrences of the different types of events in the network. For example, the types of events may include: incoming requests; dropped requests; time outs; callouts; responses to the callouts; and replies.

Furthermore, the pretrained machine-learning model may include a neural network. For example, the neural network may include a recurrent neural network, which may use or may have a long short-term memory architecture.

Additionally, the remedial action may include: providing an alert or an alarm; correcting the anomaly or the error; diagnosing the anomaly or the error based at least in part on the aggregated information; and/or identifying where the anomaly or the error is in the network.

In some embodiments, the processor or the integrated circuit computes differences in the aggregated information as a function of time and/or normalizes the aggregated information.

Moreover, the aggregated information may include inputs to the pretrained machine-learning model and outputs from the pretrained machine-learning model. The processor may use the inputs and the outputs to dynamically update or retrain the machine-learning model.

Another embodiment provides the integrated circuit, such as one or more graphical processor units (GPU).

Another embodiment provides an instance of a second electronic device. The instance of the second electronic device may collect the information, and then may provide the information to the electronic device.

Another embodiment provides a computer-readable storage medium for use with the electronic device or the instance of the second electronic device. This computer-readable storage medium may include program instructions that, when executed by the electronic device or the instance of the second electronic device, cause the electronic device or the instance of the second electronic device to perform at least some of the aforementioned operations.

Another embodiment provides a method. This method includes at least some of the operations performed by the electronic device or the instance of the second electronic device.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
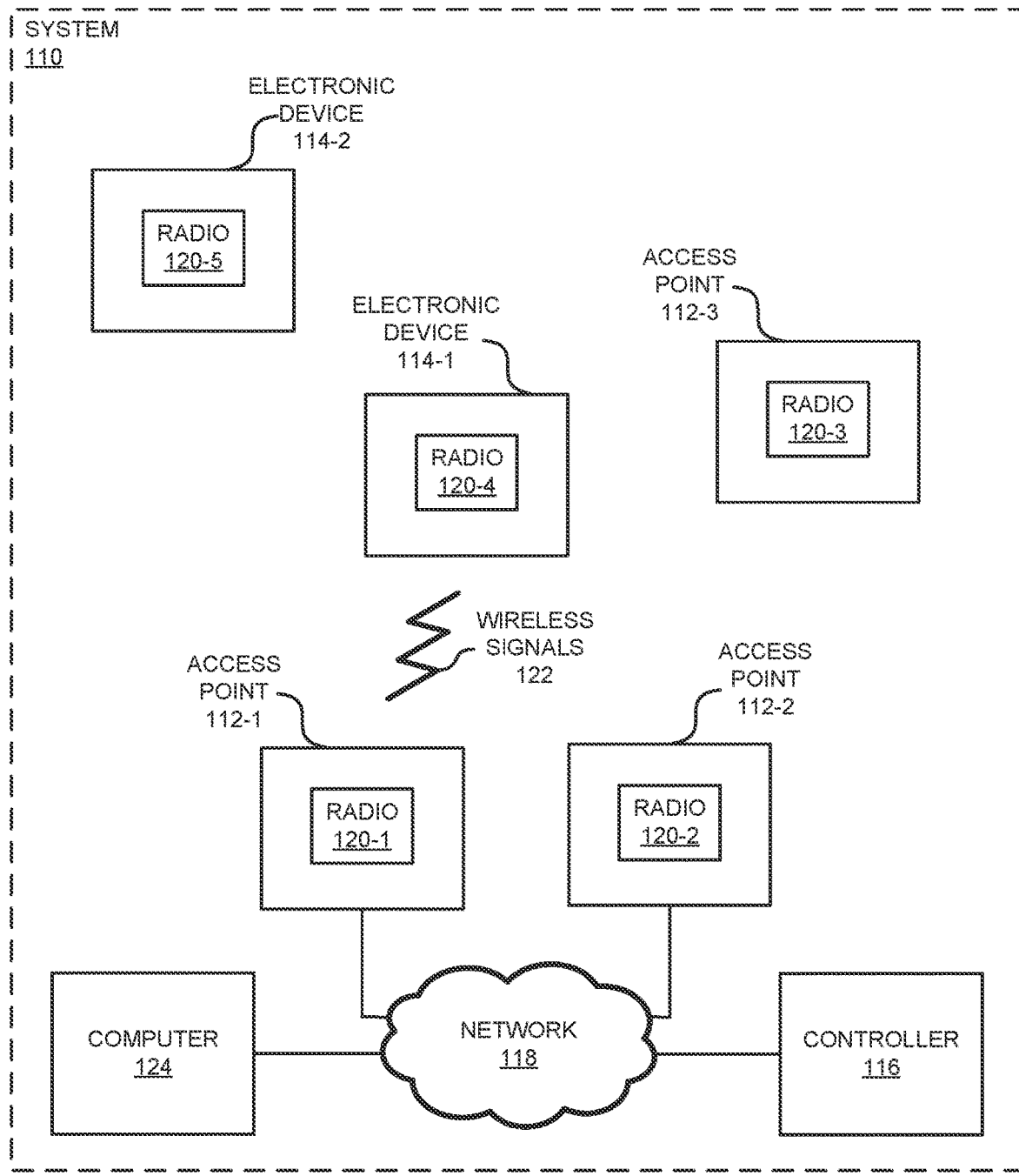
FIG. 1 is a block diagram illustrating an example of a system in accordance with an embodiment of the present disclosure.

An electronic device (such as a computer) is described. This electronic device includes an interface circuit that communicates with second electronic devices, which are included in a network; memory that stores program instructions; a processor that executes the program instructions; and an integrated circuit that implements a pretrained machine-learning model (such as a neural network). During operation, the interface circuit receives, from the second electronic devices, information that specifies occurrences of different types of events in the network. For example, the information may include counts of the occurrences of the different types of events in the network, which may be collected by the second electronic devices. Then, the processor aggregates the information about the different types of events in the network, and stores the aggregated information in the memory. Moreover, the integrated circuit predicts an occurrence of an anomaly or an error in the network based at least in part on the aggregated information. Next, the processor selectively performs a remedial action based at least in part on the prediction.

By predicting the occurrence of the anomaly or the error and then selectively performing the remedial action, these communication techniques may facilitate improved monitoring and managing of the network. Notably, the communication techniques use the aggregated information to interpret or diagnosis the anomaly or the error and/or to identify where the anomaly or the error is in the network. Moreover, the communication techniques may allow corrective or preventive action to be taken before the predicted occurrence of the anomaly or the error. Consequently, the communication techniques may facilitate the collection, interpretation and use of the information in the network. These capabilities may allow the monitoring and management of the network to be used at scale (such as in large deployments), and may improve the reliability and the performance of the network.

In the discussion that follows, electronic devices or components in a system communicate packets or frames in accordance with a wireless communication protocol, such as: a wireless communication protocol that is compatible with an IEEE 802.11 standard (which is sometimes referred to as 'Wi-Fi®,' from the Wi-Fi Alliance of Austin, Tex.), Bluetooth, a cellular-telephone network or data network communication protocol (such as a third generation or 3G communication protocol, a fourth generation or 4G communication protocol, e.g., Long Term Evolution or LTE (from the 3rd Generation Partnership Project of Sophia Antipolis, Valbonne, France), LTE Advanced or LTE-A, a fifth generation or 5G communication protocol, or other present or future developed advanced cellular communication protocol), and/or another type of wireless interface (such as another WLAN interface). For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies. Moreover, an access point, a radio node, a base station, a router or a switch in the network may communicate with a local or remotely located computer (such as a controller) using a wired communication protocol, such as a wired communication protocol that is compatible with an IEEE 802.3 standard (which is sometimes referred to as 'Ethernet'), e.g., an Ethernet II standard. In some embodiments, a radio node may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than LTE), etc. However, a wide variety of communication protocols may be used in the system, including wired and/or wireless communication. In the discussion that follows, Wi-Fi and Ethernet are used as illustrative examples.

We now describe some embodiments of the communication techniques. FIG. 1 presents a block diagram illustrating an example of a system 110, which may include components, such as: one or more access points 112, one or more electronic devices 114 (such as cellular telephones, stations or clients, another type of electronic device, etc.), controller 116 and optional computer 124. In system 110, one or more of the one or more access points 112 may wirelessly communicate with one or more of the one or more electronic devices 114 using wireless communication that is compatible with an IEEE 802.11 standard. Thus, the wireless communication may occur in, e.g., a 2.4 GHz, a 5 GHz, a 6 GHz and/or a 60 GHz frequency band. (Note that IEEE 802.11ad communication over a 60 GHz frequency band is sometimes referred to as 'WiGig.' In the present discussion, these embodiments are also encompassed by 'Wi-Fi.') However, a wide variety of frequency bands may be used. Moreover, the one or more access points 112 may communicate with controller 116 via network 118 (such as the Internet, an intra-net and/or one or more dedicated links). Note that controller 116 may be at the same location as the other components in system 110 or may be located remotely (i.e., at a different location, such as a cloud-based controller). Moreover, note that the one or more access points 112 may be managed and/or configured by controller 116. Furthermore, note that at least one of the one or more access points 112 may provide access to network 118 (e.g., via an Ethernet protocol), and may be a physical access point or a virtual or 'software' access point that is implemented on a computer or an electronic device. In some embodiments, one or more of access points 112 (such as access point 112-3) may communicate wirelessly with at least another of access points 112 (such as access point 112-2). Thus, access point 112-3 may be a mesh access point in a mesh network, and access point 112-2 may be a root access point in the mesh network. While not shown in FIG. 1, there may be additional components or electronic devices, such as a switch or a router.

Additionally, as noted previously, the one or more access points 112 and the one or more electronic devices 114 may communicate via wireless communication. Notably, one or more of access points 112 and one or more of electronic devices 114 may wirelessly communicate while: transmitting advertising frames on wireless channels, detecting one another by scanning wireless channels, exchanging subsequent data/management frames (such as association requests and responses) to establish a connection, configure security options (e.g., Internet Protocol Security), transmit and receive frames or packets via the connection (which may include the association requests and/or additional information as payloads), etc.

Figure 6:
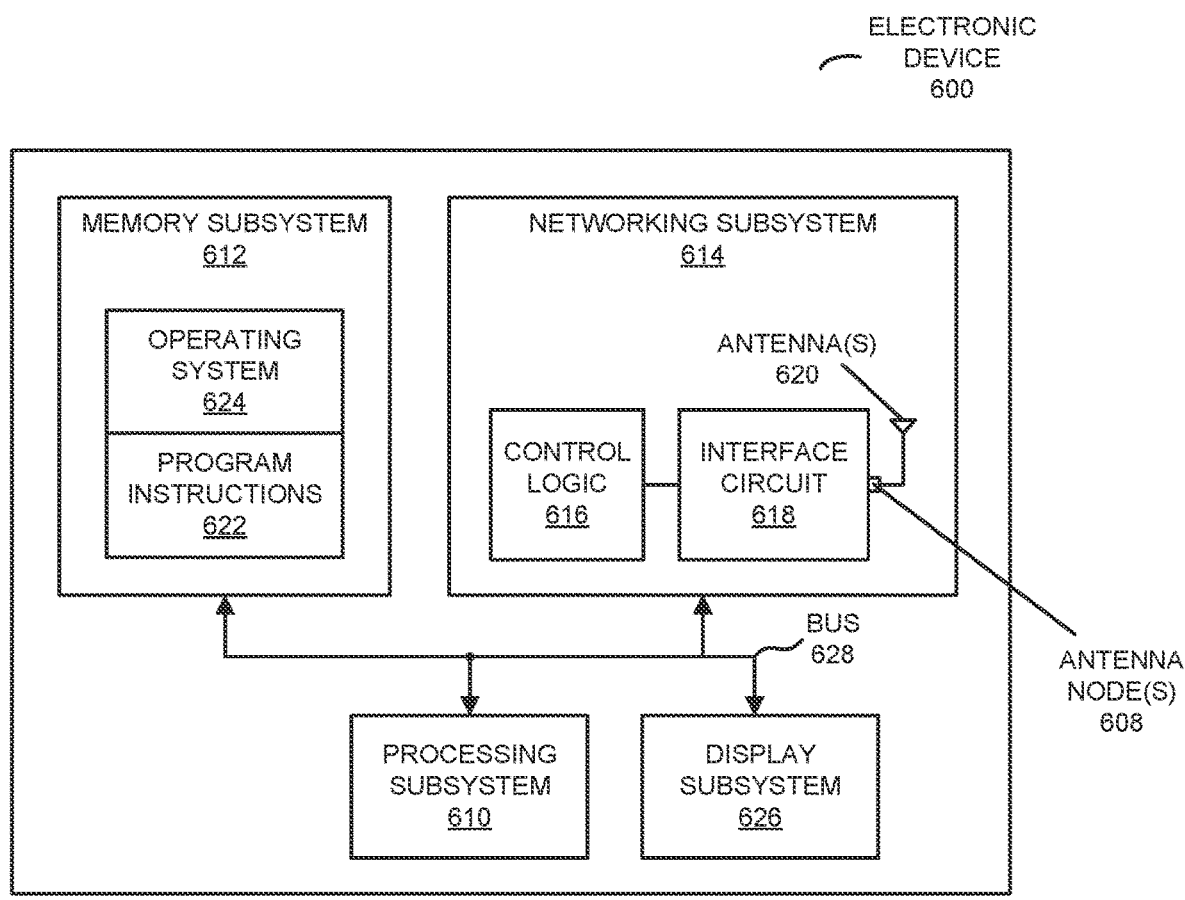
FIG. 6 is a block diagram illustrating an example of an electronic device in accordance with an embodiment of the present disclosure.

As described further below with reference to FIG. 6, the one or more access points 112, the one or more electronic devices 114 and/or controller 116 may include subsystems, such as a networking subsystem, a memory subsystem and a processor subsystem. In addition, the one or more access points 112 and the one or more electronic devices 114 may include radios 120 in the networking subsystems. More generally, the one or more access points 112 and the one or more electronic devices 114 can include (or can be included within) any electronic devices with the networking subsystems that enable the one or more access points 112 and the one or more electronic devices 114 to wirelessly communicate with each other.

As can be seen in FIG. 1, wireless signals 122 (represented by a jagged line) are transmitted from a radio 120-4 in electronic device 114-1. These wireless signals are received by a radio in at least one of the one or more access points 112, such as radio 120-1 in access point 112-1. Notably, electronic device 114-1 may transmit frames or packets. In turn, these frames or packets may be received by access point 112-1. This may allow electronic device 114-1 to communicate information to access point 112-1. (Similarly, access points 112-2 and 112-3 may communicate packets or frames with each other.) Note that the communication between electronic device 114-1 and access point 112-1 (or between access points 112-2 and 112-3, or between any of access points 112 and controller 116) may be characterized by a variety of performance metrics, such as: a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 120 are shown in the one or more electronic devices 114 and the one or more access points 112, one or more of these instances may be different from the other instances of radios 120.

As noted previously, it can be difficult to collect, interpret and use information about events in networks in order to maintain or improve communication performance. In order to address these challenges, access points 112 and controller 116 (op optional computer 124) may use or implement embodiments of the communication techniques.

Notably, access points 112 may collection information that specifies occurrences of different types of events during communication with electronic devices 114 and/or other components in system 110. For example, access point 112-1 may include counters that collect counts of the occurrences of the different types of events in a network, such as one or more WLANs. In some embodiments, the types of events may include: incoming requests; dropped requests; time outs; callouts (or dependencies) to other electronic devices; responses to the callouts; and replies.

Then, access points 112 may provide the collected information to controller 116 (or optional computer 124). After receiving the information, controller 116 may aggregate the information. For example, controller 116 may aggregate the information received from access points 112 during a time interval (such as an hour, a day, a week, etc.) and may store the aggregated information in a computer-readable memory. In some embodiments, controller 116 may aggregate information received from a given type of computer network device (such as access point 112) separately from the information received from one or more other types of component in system 100 (such as radio nodes, switches or routers).

Moreover, controller 116 may predict an occurrence of an anomaly or an error in the network based at least in part on the aggregated information. For example, the controller may compute or calculate the prediction using a pretrained machine-learning model, such as a neural network. In some embodiments, the neural network may include a recurrent neural network, which may use or may have a long short-term memory architecture.

Next, controller 116 selectively performs a remedial action based at least in part on the prediction. For example, the remedial action may include: providing an alert or an alarm; correcting the anomaly or the error; diagnosing the anomaly or the error based at least in part on the aggregated information; and/or identifying where the anomaly or the error is in the network.

In some embodiments, controller 116 computes differences in the aggregated information as a function of time and/or normalizes the aggregated information.

Moreover, the aggregated information may include inputs to the pretrained machine-learning model and outputs from the pretrained machine-learning model. Controller 116 may use the inputs and the outputs to dynamically update or retrain the machine-learning model.

In these ways, the communication techniques may facilitate improved monitoring and managing of the network, especially in large-scale deployments. Notably, pretrained machine-learning model may allow automated interpretation of the aggregated information, which may allow controller 116 to predict the occurrence of the anomaly or the error. Consequently, the communication techniques may help ensure that neither an event or a behavior log or translation of the contents of the event or the behavior log into a human-interpretable format is a bottleneck during testing or operation of the network. Therefore, the communication techniques may facilitate improved performance of the network, and may provide improved reliability by, e.g., allowing the root cause and/or the location of the anomaly or the error to be identified.

In the described embodiments, processing a frame or a packet in a given one of the one or more access points 112 or a given one of the one or more electronic devices 114 may include: receiving wireless signals 122 with the frame or packet; decoding/extracting the frame or packet from the received wireless signals 122 to acquire the frame or packet; and processing the frame or packet to determine information contained in the frame or packet.

Although we describe the network environment shown in FIG. 1 as an example, in alternative embodiments, different numbers or types of electronic devices or components may be present. For example, some embodiments comprise more or fewer electronic devices or components. Therefore, in some embodiments there may be fewer or additional instances of at least some of the one or more access points 112, the one or more electronic devices 114 and/or controller 116. As another example, in another embodiment, different electronic devices are transmitting and/or receiving frames or packets.

Figure 2:
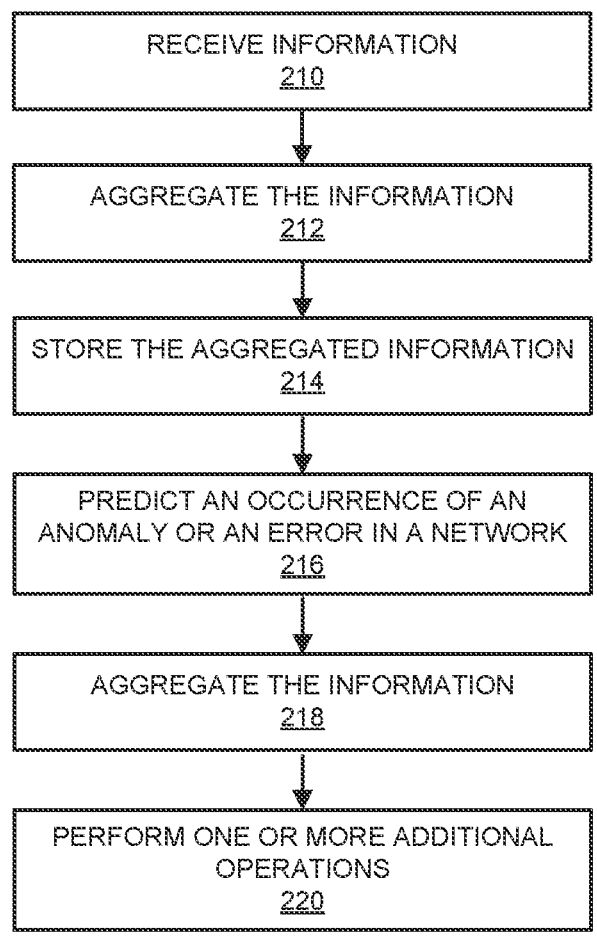
FIG. 2 is a flow diagram illustrating an example method for predicting an occurrence of an anomaly or an error in a network using an electronic device in the system in FIG. 1 in accordance with an embodiment of the present disclosure.

We now describe embodiments of the method. FIG. 2 presents an example of a flow diagram illustrating an example method 200 for predicting an occurrence of an anomaly or an event in a network. Moreover, method 200 may be performed by an electronic device, such as controller 116 in FIG. 1.

During operation, the electronic device may receive, from second electronic devices, information (operation 210) that specifies occurrences of different types of events in the network. Note that the network may include one or more WLANs and the second electronic devices may access points. Moreover, the information may include counts of the occurrences of the different types of events in the network. For example, the types of events may include: incoming requests; dropped requests; time outs; callouts; responses to the callouts; and replies.

Then, the electronic device may aggregate the information (operation 212) about the different types of events in the network, and may store the aggregated information (operation 214) in memory.

Moreover, the electronic device may, using a pretrained machine-learning mode, predict an occurrence of the anomaly or the error in the network (operation 216) based at least in part on the aggregated information. For example, the pretrained machine-learning model may include a neural network. In some embodiments, the neural network may include a recurrent neural network, which may use a long short-term memory architecture. Note that, more generally, the machine-learning model may use or may be based at least in part on one or more of a wide variety of learning techniques, such as a classifier or a regression model that was trained using: a supervised learning technique (e.g., a support vector machine, a classification and regression tree, logistic regression, LASSO, linear regression and/or another linear or nonlinear supervised-learning technique).

Next, the electronic device may selectively perform a remedial action (operation 218) based at least in part on the prediction. For example, the remedial action may include: providing an alert or an alarm; correcting the anomaly or the error; diagnosing the anomaly or the error based at least in part on the aggregated information; and/or identifying where the anomaly or the error is in the network.

In some embodiments, the electronic device optionally performs one or more additional operations (operation 220). For example, the electronic device may compute differences in the aggregated information as a function of time and/or may normalize the aggregated information (such as based on an extremum value).

Moreover, the aggregated information may include inputs to the pretrained machine-learning model and outputs from the pretrained machine-learning model. The electronic device may use the inputs and the outputs to dynamically update or retrain the machine-learning model. For example, the machine-learning model may be retrained: once; as-needed (such as based at least in part on an accuracy of the prediction, which may be indicated by feedback about the prediction that is received by the electronic device); and/or continuously (such as when an instance of the information is received from the second electronic devices).

In some embodiments of method 200, there may be additional or fewer operations. Moreover, there may be different operations. Furthermore, the order of the operations may be changed, and/or two or more operations may be combined into a single operation.

Figure 3:
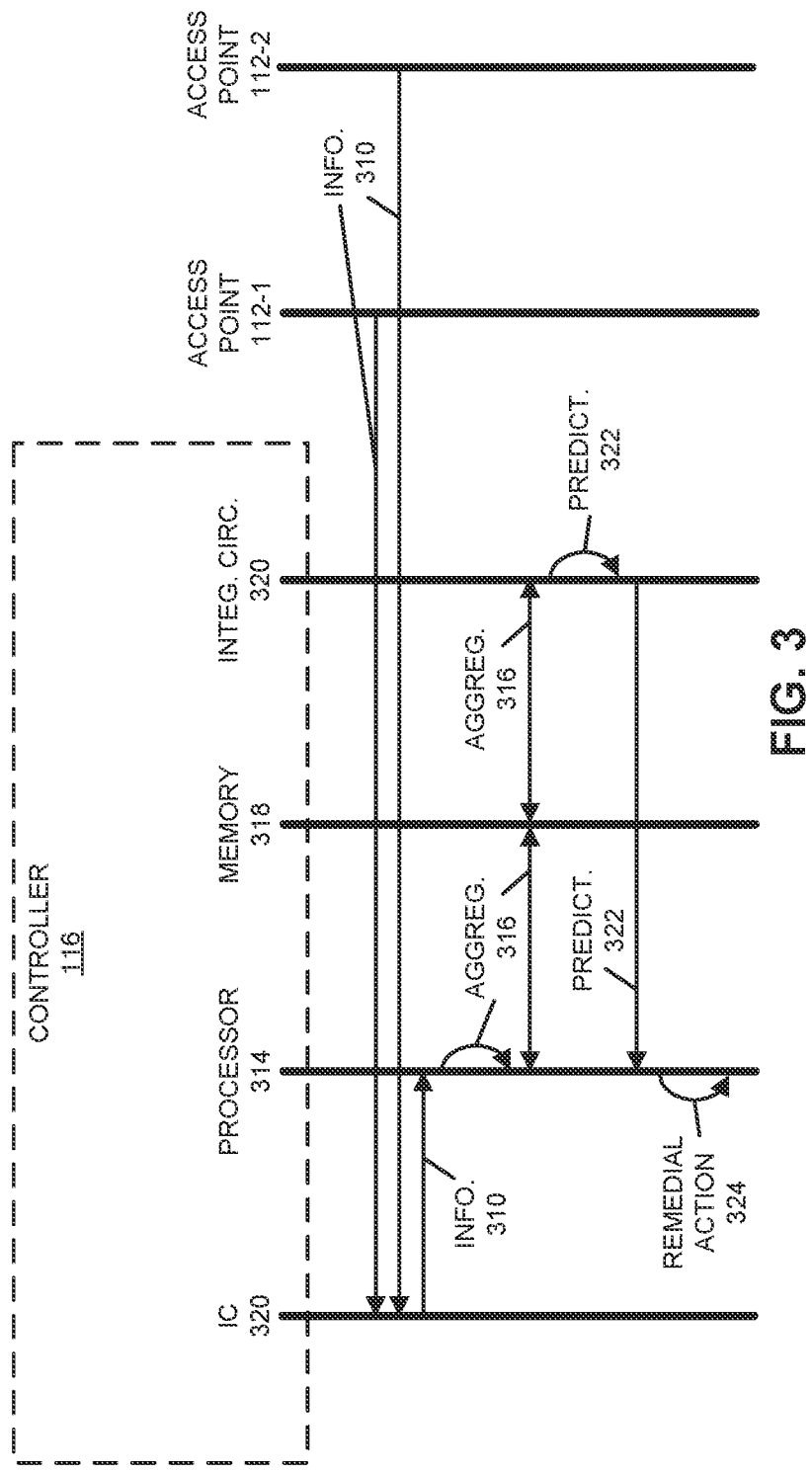
FIG. 3 is a drawing illustrating an example of communication among electronic devices in FIG. 1 in accordance with an embodiment of the present disclosure.

FIG. 3 presents a drawing illustrating an example of communication between access point 112-1, access point 112-2 and controller 116. In FIG. 3, integrated circuits in access points 112-1 and 112-2 may provide information 310 specifying occurrences of different types of events in a network. While FIG. 3 illustrates information 310 being provided by two access points, in general information 310 may be provided by one or more access points in the network.

After receiving information 310, interface circuit 312 (IC) in controller 116 may provide information 310 to processor 314 in controller 116. Processor 314 may aggregate 316 information 310 (e.g., into time windows) and store the aggregated information 316 in memory 318 in controller 116.

Then, integrated circuit 320 in controller 116 may access the aggregated information 316, and may predict 322 an occurrence of an anomaly or an event based at least in part on the aggregated information 316 and a pretrained machine-learning model. (While not shown in FIG. 3, in some embodiments processor 314 may instruct integrated circuit 320 when to perform the accessing and/or the predicting operations.) Moreover, integrated circuit 320 may provide prediction 322 to processor 314.

Next, processor 314 may selectively perform a remedial action 324 based at least in part on prediction 322. For example, processor 314 may: diagnose the anomaly or the error based at least in part on the aggregated information 316; or identify where the anomaly or the error is in the network.

While FIG. 3 illustrates some operations using unilateral or bilateral communication (which are, respectively, represented by one-sided and two-sided arrows), in general a given operation in FIG. 3 may involve unilateral or bilateral communication.

In some embodiments, the communication techniques are used to perform long short-term modeling in microservices, such as of performance and/or health prediction. In many communication systems, an engineer analyses event or behavior logs to debug anomalies or errors. However, it is not easy to scale this approach or to maintain performance.

In order to address these problems, the communication techniques use a neural network (and, more generally, a machine-learning model) in order to rapidly (and automatically) predict an anomaly or an event (such as when the system loading is too heavy or excessive) and/or identify the root cause of the anomaly or the error in a network. Moreover, instead of the information in existing event or behavior logs, in some embodiments other types of information are used to train and as inputs to the neural network.

In some embodiments, the neural network uses a long short-term memory architecture in a recurrent neural network. In contrast with a feedforward neural network, long short-term memory has feedback connections. Consequently, this type of neural network can process single data points (such as images), but also entire sequences of data (such as speech or video). For example, long short-term memory is applicable to tasks such as unsegmented, connected handwriting recognition, speech recognition, and/or anomaly detection in network traffic or an IDS (intrusion detection system).

Note that long short-term memory neural networks are well-suited to classifying, processing and making predictions based on time-series data, because there can be lags of unknown duration between important events in a time series.

In order for the neural network to be functional, the input information may need to digitized or quantized. But how can software behavior be digitized. In some embodiments, the digital information may be captured or collected in two operations.

Figure 4:
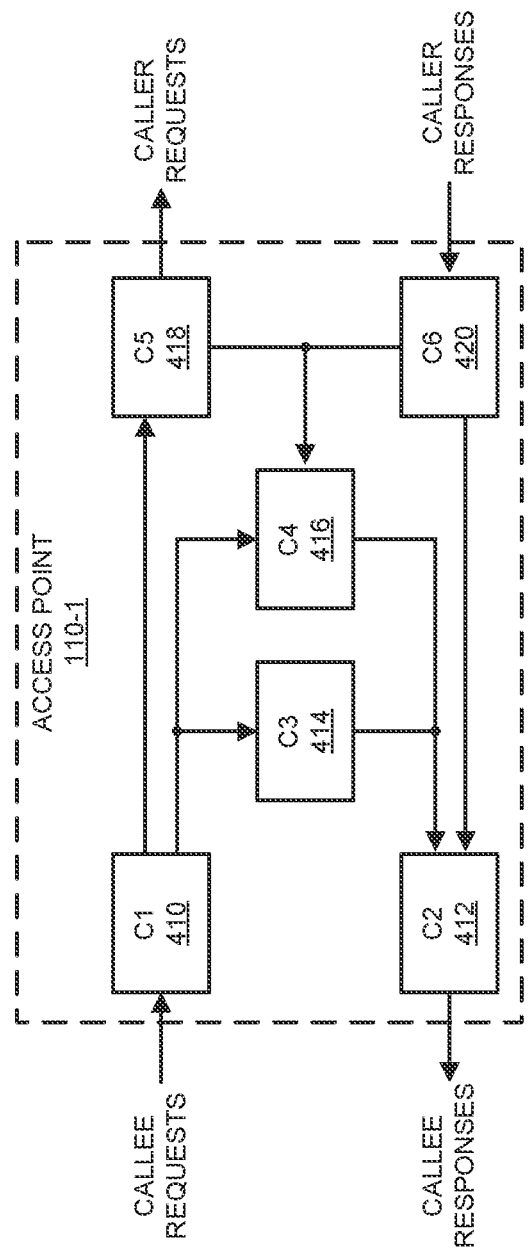
FIG. 4 is a drawing illustrating an example of relationships among counters for different types of events in a network in accordance with an embodiment of the present disclosure.

In a first operation, counters are used by computer network devices (such as access points or radio nodes) to collect information specifying occurrences of different types of network events. FIG. 4 presents a drawing illustrating an example of relationships among counters for different types of events in a network. Notably, in a given computer network device (such as access point 110-1), there may be counters for six different types of events in a network: a callee request counter (C1) 410, a callee response counter (C2) 412, a dropped request counter (C3) 414, an error counter (C4) 416, a caller request counter (C5) 418, and a caller response counter (C6) 420. Note that counters 410-420 may not distinguish between events associated with different traffic flows in the network.

Callee request counter 410 may count external requests, such an application programming interface (API) call (e.g., opening of a browser, a transmission control protocol message or request, etc.). Using this counter, the number of requests may be collected.

Moreover, callee response counter 412 may include two parts or portions. A first part that counts successful responses, and a second part that counts error responses.

Furthermore, because service may be unavailable temporarily (such as because of a hardware threshold, another system limitation, or a specific protection), incoming requests may be dropped. Dropped request counter 414 may collect information about these events. In this case, an error counter in callee response counter 412 may also be incremented.

Additionally, error counter 416 may count errors, such as an internal system fault, exceptions, timeouts for caller requests and/or errors in caller responses. In some embodiments, in order to facilitate root-cause analysis of an anomaly or an error, there may be a separate or individual counter for each type of error.

Note that caller request counter 418 may count the requests sent out to an external system (which are sometimes referred to as 'dependencies'). Usually, there is one of two results to such dependent request: a timeout, or a response is received. If a timeout occurs, error counter 416 may be incremented.

Moreover, caller response counter 420 may count a number of responses that are received from the external system. The responses may be successful or may indicate a failure. If an error occurred, error counter 416 may be incremented.

In a second operation, a delta or a difference may be calculated. Notably, a counter is an incremental number. Consequently, if there is no pre-processing, the counts will increase (until a counter wraps around). It may be difficult for a neural network to learn or analyze the collected information if the counts are always increasing or if they vary of a large range of values. Therefore, in some embodiments of the communication techniques, a fixed time interval (such as a time interval between 1 and 3 min., although a different time interval may be used) is used and a delta or a difference in a given count is determined between the time intervals. For example, the counts in FIG. 4 may be converted into deltas that provide more understandable information.

In the long short-term memory modeling, because there may be multiple counters inside different microservices, a multivariate machine-learning model may be used. Moreover, the prediction may be performed in one or multiple operations. Using multiple operations as an illustration, assume data is sampled every 3 min. After an hour, there may be 20 records. Table I summarizes the counts for the six types of error after the differences are computed.

TABLE 1

| | |
|---|---|
| C1 | [10, 20, 30, 40, 50, 60, 70, 80, 90, 100, 110, 120, 130, 140, 150, 160, 170, 180, 190, 200] |
| C2 | [11, 21, 31, 41, 51, 61, 71, 81, 91, 101, 111, 121, 131, 141, 151, 161, 171, 181, 191, 201] |
| C3 | [12, 22, 32, 42, 52, 62, 72, 82, 92, 102, 112, 122, 132, 142, 152, 162, 172, 182, 192, 202] |
| C4 | [13, 23, 33, 43, 53, 63, 73, 83, 93, 103, 113, 123, 133, 143, 153, 163, 173, 183, 193, 203] |
| C5 | [14, 24, 34, 44, 54, 64, 74, 84, 94, 104, 114, 124, 134, 144, 154, 164, 174, 184, 194, 204] |
| C6 | [15, 25, 35, 45, 55, 65, 75, 85, 95, 105, 115, 125, 135, 145, 155, 165, 175, 185, 195, 205] |

Note that C1, C2, C5, C6 are normal operation, and C3 and C4 are relative to or indicative or an anomaly. Consequently, if C3 and C4 are always zero, the network operation is perfect (there are no anomalies or events). However, if C3 and C4 are not always zero, they we would like to predict when anomalies or errors occur (i.e., when they are non-zero). Therefore, C1, C2, C5 and C6 may be inputs to the machine-learning model, and C3 and C4 may be the output from the machine-learning model.

In some embodiments of the communication techniques, the counts in Table 1 may be grouped or aggregated in 15 min. time windows (which may result in five aggregated groups of counts), and then two 15 min. time windows may be used for prediction. This is shown in Table 2. Then, the data may be applied to machine-learning model for anomaly or error detection or prediction.

TABLE 2

| Input | Output |
|---|---|
| [[10, 11, 14, 15], [20, 21, 24, 25], [30, 31, 34, 35], [40, 41, 44, 45], [50, 51, 54, 55]] | [[62, 63], [72, 73]] |
| [[20, 21, 24, 25], [30, 31, 34, 35], [40, 41, 44, 45], [50, 51, 54, 55], [60, 61, 64, 65]] | [[72, 73], [82, 83]] |
| [[30, 31, 34, 35], [40, 41, 44, 45], [50, 51, 54, 55], [60, 61, 64, 65], [70, 71, 74, 75]] | [[82, 83], [92, 93]] |
| [[40, 41, 44, 45], [50, 51, 54, 55], [60, 61, 64, 65], [70, 71, 74, 75], [80, 81, 84, 85]] | [[92, 93], [102, 103]] |
| [[50, 51, 54, 55], [60, 61, 64, 65], [70, 71, 74, 75], [80, 81, 84, 85], [90, 91, 94, 95]] | [[102, 103], [112, 113]] |
| . . . | . . . |

In summary, the communication techniques may be used to collect data and retrain the machine machine-learning model on a daily basis. The temporal granularity may depend on the data characteristics and the system requirements. For example, if the C3 and C4 predictions are not continuously zero in the 15 min. time windows, then it may be concluded that a microservice is dropping into or encountering trouble. Note that some microservices may have a tight coupling, so that counters cross different microservices may be coupled or combined for more precise predictions. Moreover, using the communication techniques it may not be necessary to preprocess and analyze event or behavior log into a format that human can interpret. Indeed, it may not be necessary for a human to review the event or behavior log. Instead, the communication techniques may be used to directly collect and provide the counts for the long short-term memory modeling, which may be more efficient.

Figure 5:
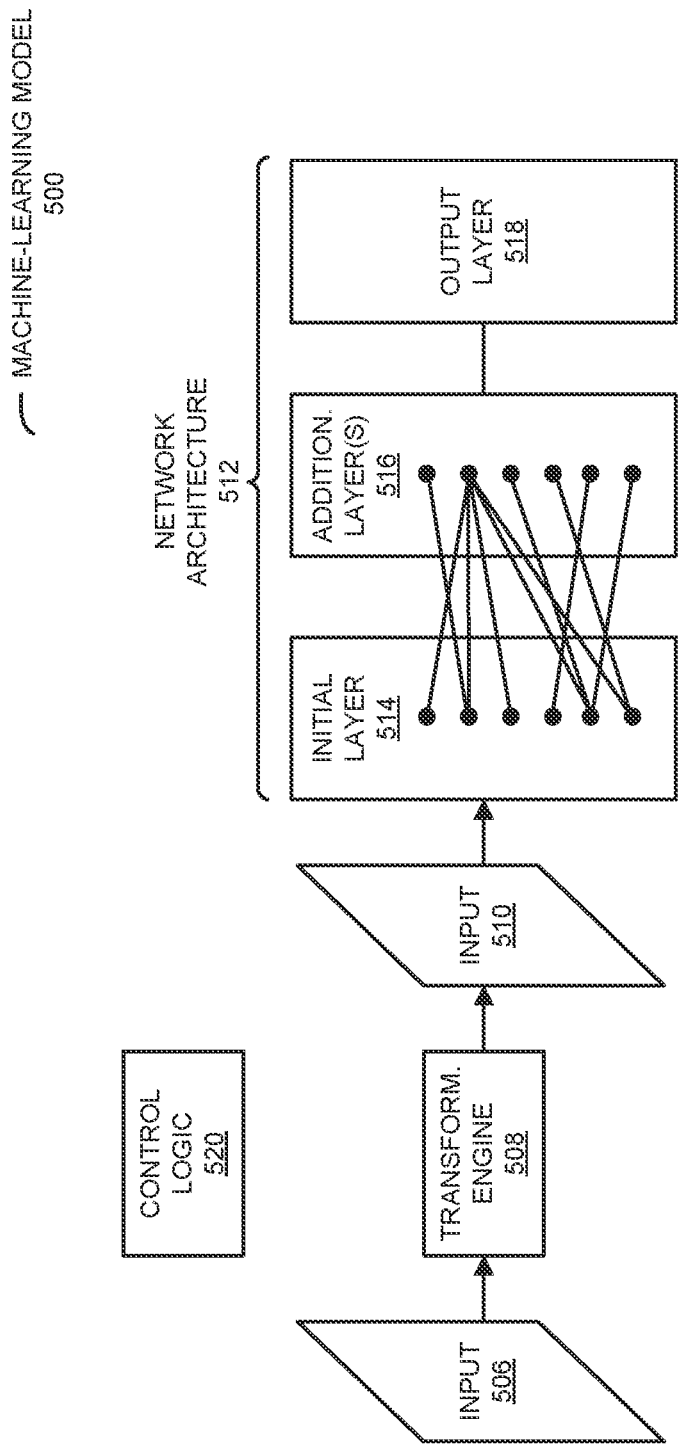
FIG. 5 is a drawing illustrating an example of a machine-learning model in accordance with an embodiment of the present disclosure.

FIG. 5 presents a drawing illustrating an example of a machine-learning model 500. Notably, machine-learning model 500 may be implemented using a recursive neural network. This neural network may include a network architecture 512 that includes: an initial layer 514 that, e.g., provides filtering of input 510; an additional layer(s) 516 that apply weights; and an output layer 518 that performs regression or classification (such as prediction of an occurrence of an anomaly or an error). Note that the details with the different layers in machine-learning model 500, as well as their interconnections, may define network architecture 512 (such as a long short-term memory architecture). In some embodiments, machine-learning model 500 is reformulated as a series of matrix multiplication operations.

Machine-learning model 500 may be able to handle the real-world variance in 1 million events or more. However, machine-learning model 500 may be trained or developed based at least in part on input 510 corresponding to events associated with packets or frames having particular formats (such as a format that is compatible with one or more communication protocols or standards). Thus, machine-learning model 500 may have an input receptive field that expects a particular type of input. Nonetheless, in general an initial input 506 may have a different format. For example, relative to input 510, input 506 may have one of a variety of formats or representations.

Thus, in order to analyze input 506 using machine-learning model 500, it may need to be transformed using one or more pre-processing transformations by transformation engine, module or circuit 508 into input 510. Note that the one or more pre-processing transformations may include: computing counts of different types of events, aggregating counts as a function of time, calculating differences in counts as a function of time, normalizing counts, etc.

Machine-learning model 500 may specify the one or more pre-processing transformations performed by transformation engine 508. Alternatively, control logic 520 may analyze input 506 to select the one or more pre-processing transformations performed by transformation engine 508. Thus, in some embodiments, the one or more pre-processing transformations (and, more generally, front-end processing of input 506) may be optimized (such as by using hyper-parameter optimization), and may be performed by machine-learning model 500 and/or control logic 520 (such as one or more processors).

Note that machine-learning model 500 may be used to analyze an input or a sequence of inputs, such as information that specifies the different types of events in the network during different time intervals (such as 1, 5, 10, 30 or 60 min.).

In some embodiments, machine-learning model 500 includes layers of detectors. These model features may be reused in different machine-learning models (as opposed to randomly retraining a new machine-learning model).

We now describe embodiments of a neural network. In a typical training regime, a large recursive network model may include 60 M parameters and 650,000 neurons. The recursive network model may include eight learned layers with weights, including five layers and three fully connected layers with a final 1000-way softmax that produces a distribution over the 1000 class labels. Some of the recursive layers may be followed by max-pooling layers. In order to make training faster, the recursive network model may use non-saturating neurons (such as a local response normalization) and an efficient dual parallelized GPU implementation of the recursive operation(s). In addition, in order to reduce overfitting in the fully-connected layers, a regularization technique (which is sometimes referred to as 'dropout') may be used. In dropout, the predictions of different models are efficiently combined to reduce test errors. Notably, the output of each hidden neuron is set to zero with a probability of 0.5. The neurons that are 'dropped out' in this way do not contribute to the forward pass and do not participate in backpropagation. Note that the recursive network model may maximize the multinomial logistic regression objective, which may be equivalent to maximizing the average across training cases of the log-probability of the correct label under the prediction distribution.

In some embodiments, the kernels of the second, fourth, and fifth layers are coupled to those kernel maps in the previous layer that reside on the same GPU. The kernels of the third layer may be coupled to all kernel maps in the second layer. Moreover, the neurons in the fully connected layers may be coupled to all neurons in the previous layer. Furthermore, response-normalization layers may follow the first and second layers, and max-pooling layers may follow both response-normalization layers as well as the fifth layer. A nonlinear model of neurons, such as Rectified Linear Units, may be applied to the output of every fully-connected layer.

In some embodiments, the first layer filters a 224×224×3 input with 96 kernels of size 11×11×3 with a stride of four pixels (this is the distance between the receptive field centers of neighboring neurons in a kernel map). Note that the second layer may take as input the (response-normalized and pooled) output of the first layer and may filter it with 256 kernels of size 5×5×48. Furthermore, the third, fourth, and fifth layers may be coupled to one another without any intervening pooling or normalization layers. The third layer may have 384 kernels of size 3×3×256 coupled to the (normalized, pooled) outputs of the second layer. Additionally, the fourth layer may have 384 kernels of size 3×3×192, and the fifth layer may have 256 kernels of size 3-3×192. The fully-connected layers may have 4096 neurons each. Note that the numerical values in the preceding and the remaining discussion below are for purposes of illustration only, and different values may be used in other embodiments.

In some embodiments, the network model is implemented using at least two GPUs. One GPU may run some of the layer parts while the other runs the remaining layer parts, and the GPUs may communicate at certain layers. The input of the network model may be 150,528-dimensional, and the number of neurons in the remaining layers in the network model may be given by 253,440-186,624-64,896-64,896-43,264-4096-4096-1000.

The network model may be pre-trained on a quantitative training dataset. During the training, the network model may be repeatedly subjected to the training input set and retrained using a backpropagation technique, in which errors in the output from the network model may be used as feedback to adjust the parameters in the network model until the output error in the measurement results reaches some minimum level (such as 1, 5, 10, 20 or 30%).

We now describe embodiments of an electronic device, which may perform at least some of the operations in the communication techniques. For example, the electronic device may include a component in system 110, such as one of: the one or more access points 112, the one or more electronic devices 114, controller 116 and/or optional computer 124. FIG. 6 presents a block diagram illustrating an electronic device 600 in accordance with some embodiments. This electronic device includes processing subsystem 610, memory subsystem 612, and networking subsystem 614. Processing subsystem 610 includes one or more devices configured to perform computational operations. For example, processing subsystem 610 can include one or more microprocessors, ASICs, microcontrollers, programmable-logic devices, graphical processor units (GPUs) and/or one or more digital signal processors (DSPs).

Memory subsystem 612 includes one or more devices for storing data and/or instructions for processing subsystem 610 and networking subsystem 614. For example, memory subsystem 612 can include dynamic random access memory (DRAM), static random access memory (SRAM), and/or other types of memory (which collectively or individually are sometimes referred to as a 'computer-readable storage medium'). In some embodiments, instructions for processing subsystem 610 in memory subsystem 612 include: one or more program modules or sets of instructions (such as program instructions 622 or operating system 624), which may be executed by processing subsystem 610. Note that the one or more computer programs may constitute a computer-program mechanism. Moreover, instructions in the various modules in memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 610.

In addition, memory subsystem 612 can include mechanisms for controlling access to the memory. In some embodiments, memory subsystem 612 includes a memory hierarchy that comprises one or more caches coupled to a memory in electronic device 600. In some of these embodiments, one or more of the caches is located in processing subsystem 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 600 as fast-access storage for often-used data, while the mass-storage device is used to store less frequently used data.

Networking subsystem 614 includes one or more devices configured to couple to and communicate on a wired and/or wireless network (i.e., to perform network operations), including: control logic 616, an interface circuit 618 and one or more antennas 620 (or antenna elements). (While FIG. 6 includes one or more antennas 620, in some embodiments electronic device 600 includes one or more nodes, such as nodes 608, e.g., a pad, which can be coupled to the one or more antennas 620. Thus, electronic device 600 may or may not include the one or more antennas 620.) For example, networking subsystem 614 can include a Bluetooth networking system, a cellular networking system (e.g., a 3G/4G/5G network such as UMTS, LTE, etc.), a USB networking system, a networking system based on the standards described in IEEE 802.11 (e.g., a Wi-Fi networking system), an Ethernet networking system, and/or another networking system.

In some embodiments, a transmit antenna radiation pattern of electronic device 600 may be adapted or changed using pattern shapers (such as reflectors) in one or more antennas 620 (or antenna elements), which can be independently and selectively electrically coupled to ground to steer the transmit antenna radiation pattern in different directions. Thus, if one or more antennas 620 includes N antenna-radiation-pattern shapers, the one or more antennas 620 may have $2^N$ different antenna-radiation-pattern configurations. More generally, a given antenna radiation pattern may include amplitudes and/or phases of signals that specify a direction of the main or primary lobe of the given antenna radiation pattern, as well as so-called 'exclusion regions' or 'exclusion zones' (which are sometimes referred to as 'notches' or 'nulls'). Note that an exclusion zone of the given antenna radiation pattern includes a low-intensity region of the given antenna radiation pattern. While the intensity is not necessarily zero in the exclusion zone, it may be below a threshold, such as 3 dB or lower than the peak gain of the given antenna radiation pattern. Thus, the given antenna radiation pattern may include a local maximum (e.g., a primary beam) that directs gain in the direction of an electronic device that is of interest, and one or more local minima that reduce gain in the direction of other electronic devices that are not of interest. In this way, the given antenna radiation pattern may be selected so that communication that is undesirable (such as with the other electronic devices) is avoided to reduce or eliminate adverse effects, such as interference or crosstalk.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 600 may use the mechanisms in networking subsystem 614 for performing simple wireless communication between the electronic devices, e.g., transmitting frames and/or scanning for frames transmitted by other electronic devices.

Within electronic device 600, processing subsystem 610, memory subsystem 612, and networking subsystem 614 are coupled together using bus 628. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections among the subsystems.

In some embodiments, electronic device 600 includes a display subsystem 626 for displaying information on a display, which may include a display driver and the display, such as a liquid-crystal display, a multi-touch touchscreen, etc.

Electronic device 600 can be (or can be included in) any electronic device with at least one network interface. For example, electronic device 600 can be (or can be included in): a desktop computer, a laptop computer, a subnotebook/netbook, a server, a computer, a mainframe computer, a cloud-based computer, a tablet computer, a smartphone, a cellular telephone, a smartwatch, a wearable device, a consumer-electronic device, a portable computing device, an access point, a transceiver, a controller, a radio node, a router, a switch, communication equipment, a wireless dongle, test equipment, and/or another electronic device.

Although specific components are used to describe electronic device 600, in alternative embodiments, different components and/or subsystems may be present in electronic device 600. For example, electronic device 600 may include one or more additional processing subsystems, memory subsystems, networking subsystems, and/or display subsystems. Additionally, one or more of the subsystems may not be present in electronic device 600. Moreover, in some embodiments, electronic device 600 may include one or more additional subsystems that are not shown in FIG. 6. Also, although separate subsystems are shown in FIG. 6, in some embodiments some or all of a given subsystem or component can be integrated into one or more of the other subsystems or component(s) in electronic device 600. For example, in some embodiments program instructions 622 are included in operating system 624 and/or control logic 616 is included in interface circuit 618.

Moreover, the circuits and components in electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit' or a 'means for communication') may implement some or all of the functionality of networking subsystem 614. The integrated circuit may include hardware and/or software mechanisms that are used for transmitting wireless signals from electronic device 600 and receiving signals at electronic device 600 from other electronic devices. Aside from the mechanisms herein described, radios are generally known in the art and hence are not described in detail. In general, networking subsystem 614 and/or the integrated circuit can include any number of radios. Note that the radios in multiple-radio embodiments function in a similar way to the described single-radio embodiments.

In some embodiments, networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 622, operating system 624 (such as a driver for interface circuit 618) or in firmware in interface circuit 618. Alternatively or additionally, at least some of the operations in the communication techniques may be implemented in a physical layer, such as hardware in interface circuit 618.

Additionally, while the preceding embodiments illustrated the use of wireless signals in one or more bands of frequencies, in other embodiments of these signals may be communicated in one or more bands of frequencies, including: a microwave frequency band, a radar frequency band, 900 MHz, 2.4 GHz, 5 GHz, 6 GHz, 60 GHz, and/or a band of frequencies used by a Citizens Broadband Radio Service or by LTE. In some embodiments, the communication between electronic devices uses multi-user transmission (such as orthogonal frequency division multiple access or OFDMA).

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication technique, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
an interface circuit configured to communicate with second electronic devices;
memory storing program instructions;
a processor, coupled to the interface circuit and the memory, configured to execute the program instructions; and
an integrated circuit, coupled to the processor, that implements a pretrained machine-learning model, wherein the electronic device is configured to:
receive, at the interface circuit, information associated with the second electronic devices that specifies occurrences of different types of events in a network, wherein the information comprises counts of the occurrences of the different types of events in the network, wherein the types of events comprise errors during communication in the network, wherein the types of event comprise: incoming requests; dropped requests; time outs; callouts; responses to the callouts; and replies, and wherein a given callout in the callouts comprises a dependency with a third electronic device during the communication;
using the processor, aggregate the information about the different types of events in the network and store the aggregated information in the memory;
predict, using the integrated circuit, an occurrence of an anomaly or an error in the network based at least in part on the aggregated information; and
selectively perform, using the processor, a remedial action based at least in part on the prediction.

2. The electronic device of claim 1, wherein the network comprises one or more wireless local area networks (WLANs) and the second electronic devices comprises access points in the one or more WLANs.

3. The electronic device of claim 1, wherein the pretrained machine-learning model comprises a neural network.

4. The electronic device of claim 3, wherein the neural network comprises a recurrent neural network.

5. The electronic device of claim 3, wherein the neural network uses or has a long short-term memory architecture.

6. The electronic device of claim 1, wherein the remedial action comprises:
providing an alert or an alarm; correcting the anomaly or the error; diagnosing the anomaly or the error based at least in part on the aggregated information; or identifying where the anomaly or the error is in the network.

7. The electronic device of claim 1, wherein, using the processor or the integrated circuit, the electronic device is configured to: compute differences in the aggregated information as a function of time, normalize the aggregated information, or both.

8. The electronic device of claim 1, wherein the aggregated information comprises inputs to the pretrained machine-learning model and outputs from the pretrained machine-learning model.

9. The electronic device of claim 8, wherein the electronic device is configured to use the inputs and the outputs to dynamically update or retrain the machine-learning model.

10. A non-transitory computer-readable storage medium for use in conjunction with an electronic device, the computer-readable storage medium storing program instructions, wherein, when executed by the electronic device, the program instructions cause the electronic device to perform one or more operations comprising:
receiving information associated with the second electronic devices that specifies occurrences of different types of events in a network, wherein the information comprises counts of the occurrences of the different types of events in the network, wherein the types of events comprise errors during communication in the network, wherein the types of event comprise: incoming requests; dropped requests; time outs; callouts; responses to the callouts; and replies, and wherein a given callout in the callouts comprises a dependency with a third electronic device during the communication;
aggregating the information about the different types of events in the network;
storing the aggregated information in memory;
predicting, using a pretrained machine-learning model, an occurrence of an anomaly or an error in the network based at least in part on the aggregated information; and
selectively performing a remedial action based at least in part on the prediction.

11. The non-transitory computer-readable storage medium of claim 10, wherein the network comprises one or more wireless local area networks (WLANs) and the second electronic devices comprises access points in the one or more WLANs.

12. The non-transitory computer-readable storage medium of claim 10, wherein the information comprises counts of the occurrences of the different types of events in the network.

13. The non-transitory computer-readable storage medium of claim 10, wherein the pretrained machine-learning model comprises a neural network that uses or has a long short-term memory architecture.

14. The non-transitory computer-readable storage medium of claim 10, wherein the remedial action comprises: providing an alert or an alarm; correcting the anomaly or the error; diagnosing the anomaly or the error based at least in part on the aggregated information; or identifying where the anomaly or the error is in the network.

15. The non-transitory computer-readable storage medium of claim 10, wherein the operations comprise: computing differences in the aggregated information as a function of time, normalizing the aggregated information, or both.

16. The non-transitory computer-readable storage medium of claim 10, wherein the aggregated information comprises inputs to the pretrained machine-learning model and outputs from the pretrained machine-learning model.

17. The non-transitory computer-readable storage medium of claim 16, wherein the operations comprise using the inputs and the outputs to dynamically update or retrain the machine-learning model.

18. A method for predicting an occurrence of an anomaly or an event in a network, comprising:
by an electronic device:
receiving, using an interface circuit in the electronic device, information associated with the second electronic devices that specifies occurrences of different types of events in a network, wherein the information comprises counts of the occurrences of the different types of events in the network, wherein the types of events comprise errors during communication in the network, wherein the types of event comprise: incoming requests; dropped requests; time outs; callouts; responses to the callouts; and replies, and wherein a given callout in the callouts comprises a dependency with a third electronic device during the communication;

aggregating, using a processor in the electronic device, the information about the different types of events in the network;

storing the aggregated information in memory;

predicting, using a pretrained machine-learning model, an occurrence of an anomaly or an error in the network based at least in part on the aggregated information; and selectively performing, using the processor, a remedial action based at least in part on the prediction.

19. The method of claim 18, wherein the pretrained machine-learning model comprises a neural network.

20. The method of claim 18, wherein the remedial action comprises: providing an alert or an alarm; correcting the anomaly or the error; diagnosing the anomaly or the error based at least in part on the aggregated information; or identifying where the anomaly or the error is in the network.

* * * * *